United States Patent [19]

Terry

[11] 4,172,506

[45] Oct. 30, 1979

[54] FLUID BEARING

[76] Inventor: Melvin D. Terry, P.O. Box 7174, Seattle, Wash. 98133

[21] Appl. No.: 784,357

[22] Filed: Apr. 4, 1977

Related U.S. Application Data

[63] Continuation-in-part of Ser. No. 594,636, Jul. 10, 1975, abandoned.

[51] Int. Cl.² .................................................. B60V 1/02
[52] U.S. Cl. ..................................... 180/125; 180/127; 308/DIG. 1; 414/676
[58] Field of Search .............................. 180/124, 125; 308/DIG. 1; 214/1 BE; 104/23 FS

[56] References Cited

U.S. PATENT DOCUMENTS

| | | | |
|---|---|---|---|
| 3,245,487 | 4/1966 | Mackie | 180/124 |
| 3,253,667 | 5/1966 | Mackie | 180/124 |
| 3,268,023 | 8/1966 | Napoli | 180/124 X |
| 3,291,237 | 12/1966 | Hopkins et al. | 180/127 |
| 3,385,390 | 5/1968 | Guienne | 180/116 |
| 3,400,780 | 9/1968 | Kesling | 180/124 |
| 3,414,076 | 12/1968 | Bertin | 180/124 |
| 3,513,936 | 5/1970 | Crowley et al. | 180/124 |
| 3,610,364 | 10/1971 | Snoeyenbos | 180/127 X |
| 3,724,588 | 4/1973 | Bertin | 180/118 |
| 3,756,343 | 9/1973 | Joyce | 180/127 |
| 3,757,699 | 9/1973 | Wirth | 180/124 X |

*Primary Examiner*—John P. Silverstrim

[57] ABSTRACT

A fluid film bearing suitable for use with either liquid or gaseous fluid and capable of far greater lift because of the larger usable lifting surface. The larger lifting surface is achieved in that the bearing assumes a square, rectangular, or race track configuration, a configuration which is more easily adapted for use in combinations of multiple bearings for large lift capacity and further may more closely approximate the shape of an object to be lifted or moved. An integral high tensile strength, flexible membrane gives the fluid bearing sufficient strength to withstand internal pressures over elongated, non-circular peripheral portions and also gives the bearing a far greater ability to flex and conform to an uneven or undulated surface thereby enabling the bearing to comply with a surface of far less uniformity without the loss of support than was heretofore possible. The utilization of a bifurcated membrane while adding strength increases the ability to comply to a greater extent as well as increasing the jacking ability.

2 Claims, 16 Drawing Figures

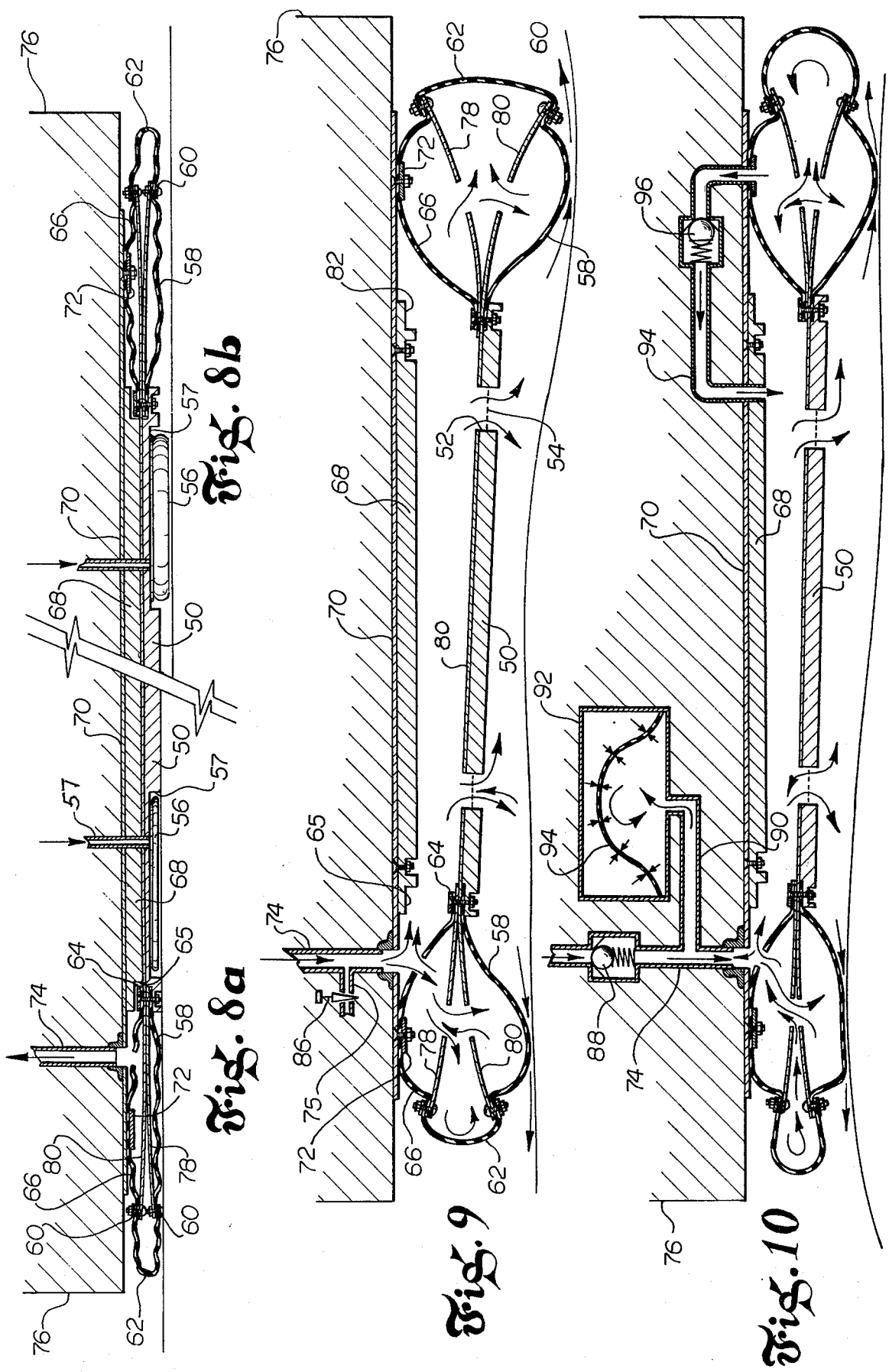

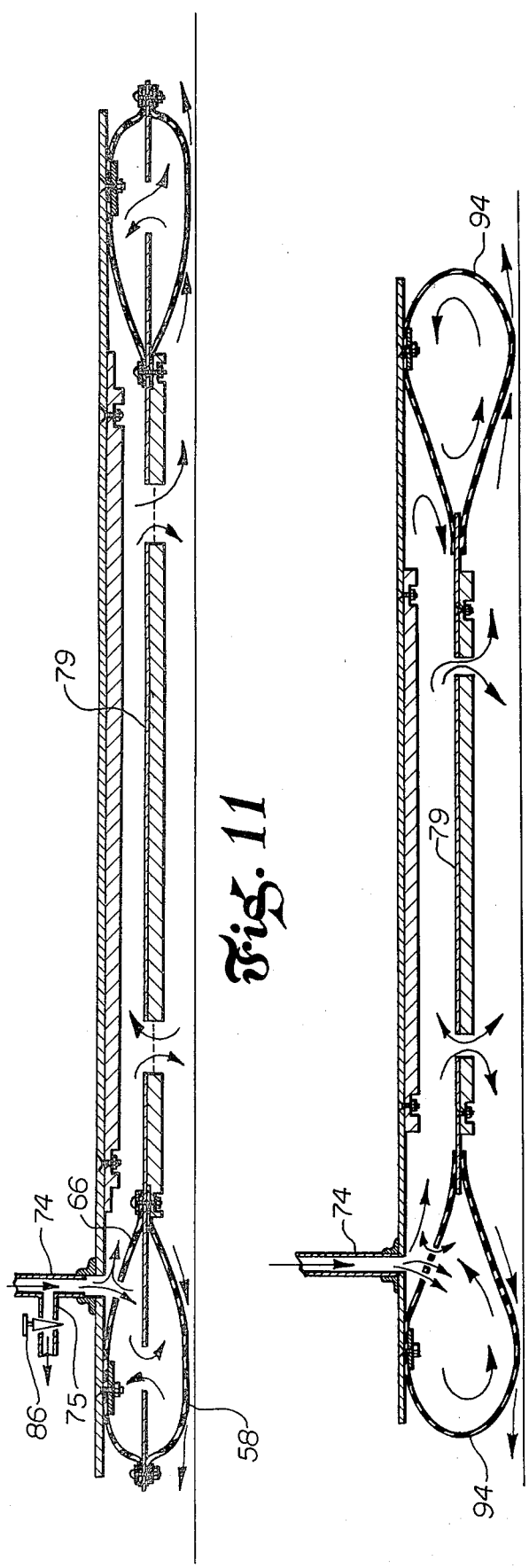

FLUID BEARING

BACKGROUND OF THE INVENTION

This application is a Continuation-in-Part of U.S. patent application Ser. No. 594,636 filed July 10, 1975 now abandoned.

The utilization of air bearings to move large objects with little effort is well known in the art and the differential both in operation and in concept between an air bearing and an air cushion device is likewise well known and well recognized.

To place things in proper context without elaboration, a fluid bearing, air or liquid, utilizes a bubble of relatively high pressure fluid to lift an object and the object is rendered relatively easily mobile by the fact that a thin film of fluid escapes from beneath the bearing which contains the bubble, releasing the object from friction with respect to the supporting surface and thus making the object easy to move. An air cushion in contrast, relies in a large volume of air moving at low pressure to lift the object a substantial distance from the supporting surface and provide a continual lifting interface between the object and the supporting surface itself. It is important to note that the cushion type vehicle can be utilized only with a gas whereas the film type apparatus may be used with either a gaseous or a liquid film. The differences between the characteristics of the two divergent and separate approaches to the movement of objects results in the fact that the approaches and solutions to problems in one of the fields is not necessarily appropriate or anticipatory to problems in the other field.

Limiting the discussion to fluid film systems, it is important to note that the original concept of air film bearings or air bearings as they are more commonly known, was approached approximately twenty years ago and more than fifteen years ago they were first used on an industrial or commercial scale, i.e., they were at that point perfected sufficiently that the materials and the reliability was such that they could be consistently and conveniently used for transfer of objects that had heretofore been difficult if not impossible to handle.

Some of the earlier developments which have been protected by patent are well known to the current inventor and include the two different patents in the name of Crowley, i.e. U.S. Pat. No. 3,513,936 granted in May 27, 1970 in the name of Crowley and Wood and the improvement patent granted to Crowley individually bearing U.S. Pat. No. 3,618,694 and granted on Nov. 9, 1971. These references will be described in greater detail hereinafter, however, it is important to note that the improvements protected by these patents transformed the air bearing from the theoretical aspect to a commercial practicality. It is further important to note, however, that the bearings continued to be of a general toroidal shape in that although they were not circular in cross-section they did have a general donut configuration, a fact, as pointed out hereinafter leading in part to the present invention. An early development by General Motors apparently did utilize a race track design but had a very limited operating pressure.

Although the improvements of Crowley did, in fact, make the air film bearing commercial and made it possible to use fluids other than air, the bearing stil remained unduly restrictive in that a large number of units were necessary to lift or transport exceedingly large loads and the circular perimeter required to withstand the internal forces prevents the placement of a large number of these in close proximity thereby reducing the effective lift area, and thus the lift capacity.

It is also important to note that the advances of Crowley made it possible to use the air bearing over load supporting surfaces which had greater variance, i.e., undulation than theretofore possible since the newly designed shape or configuration of the bag or skirt, having two halves allowed the bearing to work effectively since the bag was able to flex upwardly or downwardly relative to the rigid load supporting surface to the maximum extent. It is, however, important to note that even though the individual bearings, as designed by Crowley, were capable of operating over larger undulations, still the constraints were such that for transporting large heavy objects the area covered by the plurality of bearings was necessarily large and encompassed a great distance. Considering the distance involved, the requirements for a substantially flat floor then became highly impractical.

As touched upon briefly hereinabove, and as will be explained in greater detail hereinafter, the two problem areas not resolved by the Crowley improvements include the effective total lift of the bearings with respect to the support area required and the ability of the bearing or a multiple bearing unit to function over surfaces that are far more realistic in terms of their variance from being absolutely planar. The basic reason that the previous bearings were unable to resolve these two critical problems lies in the fact that, as will be explained hereinafter, the circular exterior of the bearing is a logical choice in that the hoop or circle is a uniform structure and uniformly reacts to and resists a uniform internal pressure such as is generated in a fluid or air bearing.

A problem faced when going to non-circular shaped bearing is that the non-circular exterior portions are subjected to a constant and uniform internal pressure which causes those portions to tend to assume a circular configuration. It is necessary, therefore, to build within the structure of the bearing itself, if it is intended to use a non-circular configuration, a means to withstand the continual outwardly directed force. If this were the only problem, it probably would have been resolved far sooner than it presently has by fabricating the skirt bag of a material of greater strength. The use of any material to increase the integrity of the bearing, however, is not practical since the bearing then reverts to a structure similar to the earlier conceptual bearings wherein the compliancy of the bearing was minimal and the bearing, in fact, had a tendency to hop under certain conditions.

It is necessary, therefore, to increase the ability of the bearing to resist the outward pressure along the noncircular portions of the bearing while not unduly restricting the vertical movement of the bearing. It is the ability of the bearing skirt to move vertically which allows it to comply with undulations in the floor and the interrelationship of the elements including the skirt configuration prevents the bearing from vertical oscillation.

Further as was noted hereinabove, although the improvement and commercialization of air bearings have made it possible to move structures far larger and of far greater weight than heretofore possible, the fact that they have limited tolerance with respect to the undulations of the supporting surface as well as with respect to the texture of the surface material has made it impossible for them to be used to a greater extent possible. It therefore, must be recognized that it is a vast improvement in terms of utility of the bearing if it were to be given greater flexibility with respect to accommodating undulations in the supporting surface and it be given the possibility of operating on surfaces which are less smooth than heretofore required. The expanded lift capability also proves yet another benefit in terms of the ability to utilize the inherent characteristic of the bearing to vertically lift prior to floatation for jacking of structures (load Mass) up and down during the users manufacturing or moving processes. The benefit has long been enjoyed by users of prior art in varying degrees, but the restricted vertical lift has prevented this benefit from being utilized to its' fullest potential.

It is to be understood that a discussion heretofore has dealt with the fluid bearing in general which includes both the better known air bearing and the liquid bearing. Each of the fluid bearings have their advantages and are preferred within differing environments. Air acquired from a standard commercial compressor source is convenient and adequate to support up to about 700 ton transfer systems. Loads to 2,000 ton have been moved on air; however, this is not normally practical because of the large number of compressors which are required to produce a sufficient quantity of air. From a practical standpoint many mass movement systems from 500 tons through about 7,000 tons are provided with fluid (water) systems because of a greatly reduced cost and more readily available source of supply, i.e., city water systems or pumping from fresh or salt water. The utilization of an air bearing, however, requires far greater energy to provide the same lift since the air must rise in pressure from that of atmosphere to the operating pressure, an expensive operation and water is often available at approximate operating pressure because of the source head. Further because of the differing nature of the two mediums, the air escapes at approximately forty times the rate of liquid thereby necessitating a greater volume requirement. Further, it is to be noted that when contemplating lifting and transferring tremendously heavy or large loads, the number of circular bearings involved or even the lift area and thus large plenum of the newly designed inventive rectangular bearing, which is far more efficient than the circular bearing, the operation requires a flow of a great deal of fluid and/or air. In order to accommodate the kinds of flow and pressure required with an air bearing, a tremendous amount of generating energy is required, a more complete analysis and discussion is found in the parent application.

As was noted in the previous paragraphs, there are times when a liquid bearing is tremendously advantageous over an air bearing, however, in addition to the climatic conditions it is apparent that a liquid bearing presents some problems in and of itself particularly when dealing with the type and size of structure herein under consideration. It must be remembered that a liquid, as opposed to a gas, is non-compressible and therefore, a rapidly moving bearing upon encountering an undulation in the supporting surface would, without proper controls, generate an impact wave which could possibly rupture the bearing or at least disturb the effectiveness of the fluid film principle.

It is important to remind ourselves at this point that the previous discussion has dealt with film bearings which are completely different from and not easily contrasted with or compared to air cushion vehicles. The prior art has acknowledged the differences between the two structures and it should suffice to restate at this point that an air film bearing relies on a thin film of fluid passing beneath the peripheal skirt of the bearing under reasonably high pressure and low volume to provide a film over which the load is passed and supported in an almost frictionless condition. An air cushion vehicle, in contrast, utilizes a large volume of air at very low pressure and operates at a substantial distance from the support surface, i.e. from as little as fractions of an inch to several feet depending on design. It is apparent that the problems which are encountered by an air cushion vehicle at considerable distance above the supporting surface and an air film bearing functioning at a 0.0011 to 0.080 inches above the supporting surface are two entirely different and generally unrelated problems.

With the above noted prior art and problems in mind, it is an object of the present invention to provide a bearing of non-uniform external configuration such that the maximum lift area may be utilized.

It is another object of the present invention to provide a fluid bearing wherein the bearing is structured such that it has far greater compliancy and thus can accommodate far greater undulation in the supporting surface without disturbing the peripheral film.

It is another object of the present invention to provide a non-circular fluid bearing wherein the uniform outwardly directed force against the skirt is counteracted along the non-circular portions of the bearings by means of an internal membrane which has high tensile strength but is flexible and therefore, moves with the skirt and is responsive to surface variations.

It is still another object of the present invention to provide a fluid bearing wherein the bearing is secured to the lower surface of the load supporting platform but is structured such that the center line or plane passing through the approximate vertical mid-section of the inflated skirt of the bearing may be moved vertically with respect to the fixed lower surface of the bearing thus greatly increasing the available compliancy and jacking ability.

Yet another object of the present invention is to provide a fluid bearing of larger size than heretofore available and one where the landing pad for the large bearing includes smaller fluid bearings of a capacity enabling the bearing to be moved from position to position by means of the smaller bearings, thus permitting the bearing to be placed in positions beneath a load, positions not readily accessible by other means.

Still a further object of the present invention is to provide a bearing having the ability to lift a load to a greater extent through the incorporation of an internal bifurcated membrane, which while retaining the skirt member in its predetermined, desired shape further permits the bearing to handle greater undulations in the supporting surface.

Yet another object of the present invention is to provide a fluid bearing which includes as an integral part thereof means to absorb shock waves generated when the bearing is traveling at a rapid rate and contacts undulations.

Still a further object of the present invention is to provide means whereby the plenum of a fluid bearing may be supercharged without affecting the pressure and/or rigidity within the skirt bag.

Still another object of the present invention is to provide a fluid bearing wherein the pressure within the bearing may be altered enabling the bearing to be utilized on rougher supporting surfaces.

Still another object of the present invention is to provide a square or rectangular fluid bearing that utilizes the maximum available lift area by avoiding loss of corner lift area as is the case with a round shape. The present invention will allow fluid bearing shapes which conform to the available framing space of the load being carried. Energy consumption is determined to a great degree by the size and length of the seal line periphery. The present invention allows greater efficiency in space.

Yet another object of the present invention is to provide a fluid bearing wherein the centerline of the skirt bag is movable toward and away from the load supporting platform to accommodate undulations in the supporting surface. Further, the skirt bag may be made much larger in cross-section without the requirement of unduly restrictive or nonpliable material through the use of a bifurcated peripheral portion of a high tensil strength membrane which retrain the skirt bag in its desired configuration while allowing the skirt bag to expand to a far greater degree.

BRIEF DESCRIPTION OF THE DRAWINGS

FIGS. 8a and 8b taken along section line 8 of FIG. 6. depict a preferred auxiliary fluid bearing means for moving a large bearing from one location to another when the main bearing is collapsed or not operational.

FIG. 9 is a sectional view taken along section line 9 of FIG. 6 of a fluid bearing illustrating the reaction and conformance to a supporting surface having an undulation.

FIG. 10 is a sectional view of a fluid bearing moving over an undulated surface and further showing means to accommodate the internal stresses generated when utilizing a non-compressible fluid.

FIG. 11 is a partial sectional view of a simple fluid film bearing.

FIG. 12 is a partial sectional view of a simple air bearing.

DETAILED DESCRIPTION OF THE DRAWINGS

Figure 1:
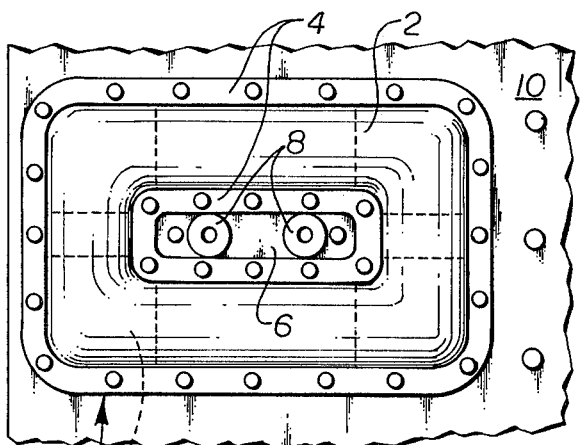
FIG. 1 is a plan view of one possible configuration of the inventive fluid bearing.

As seen in FIG. 1, one embodiment of the noncircular bearing having far greater lifting capacity for the amount of support space utilized is shown. It is to be understood that these introductory remarks will be in general terms and that each of the elements disclosed in this portion will be described in far greater detail hereinafter. As seen in this view, the bearing 2 is generally rectangular in configuration having a conventional skirt bag 3 leaving a generally unobstructed plenum in the center. Extending into the plenum portion of the rectangular bearing is a flexible sheet means 4 which extends outwardly thereof through the interior of the skirt bag 3 and is noted again at the outer periphery of the skirt bag where it is secured by a bolted ring or the like. The flexible sheet means 4 is secured at its innermost portion to a landing 6 which may be secured to an upper impermeable load supporting element 10. As will be described in detail hereinafter, the skirt may also be secured to a landing pad which is vertically movable with respect to the load, a structure which greatly increases the jacking or elevation possibilities. The landing pad has mounted thereon a pair of smaller air bearings 8 which, as will be explained hereinafter, are illustrative of a means to be utilized to move the bearing to the desired location for use. The base plate 10 which is secured to the landing pad 6 extends outwardly beyond the dimensions of the skirt bag 3.

The particular advantages and comparisons between the lifting capacity of a rectangular bearing and a plurality of circular bearings is dealt with in the parent application and reference is had thereto for statistical data. It is to be understood that the data and comparisons as set out in the parent application are included in this application by reference.

Figure 2:
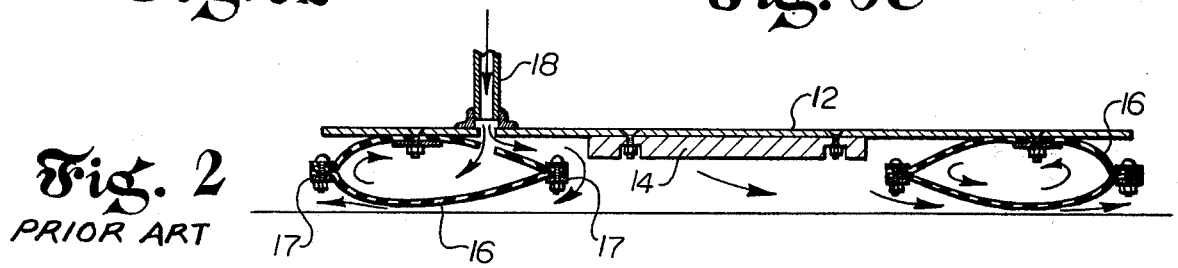
FIG. 2 is a vertical sectional view of a prior art fluid film bearing.

To further illustrate the various limitations of the prior art, FIG. 2 is directed to the generally toroidal shaped fluid film bearing as developed by Crowley. As can be seen in this view, the bearing generally comprises a support plate 12 having a landing pad 14 secured to the bottom thereof and a round or circular skirt bag 16 of approximate tear drop shape in cross section but mechanically secured about each periphery at 17 which is also secured at its top upper portion to the plate 12. As fluid is forced downwardly through the support plate 12 via conduit 18 it partially passes to the interior of the skirt bag 16 and partly into the plenum area. Once the skirt bag and the plenum area are filled, the fluid escapes beneath the skirt bag lifting the bearing and its supported load thus making the combination easy to move.

It should be apparent, the ability of the bearing supported load to be moved on smooth but undulated surface depends entirely upon the ability of the skirt bag to internally absorb these changes in the support surface without allowing an undue escape of fluid and thus a collapse of the bearing itself.

The ability to absorb or accommodate the uneven supporting surface is generally termed compliance and the compliancy zone is that vertical dimension accommodated. The ability to comply involves the movement of the fluid from the section of the skirt bag which is in contact with and moving toward a slightly higher portion of supporting surface to a section located on a lower supporting portion. This movement of the fluid inflates the skirt bag to a greater extent in the section adjacent the lower supporting portion and moving the centerline or plane passing through the midsection of the skirt bag or downwardly thus maintaining uniform contact with the supporting surface.

As will be readily apparent, the compliancy of a bearing is dependent upon the flexibility of the material which forms of the skirt bag in conjunction with the pressure under which it is expanded. It is important to remember that the pressure within the skirt bag has a direct relationship to the amount of load being carried and an inverse relationship to the skirt flexibility.

Figure 3:
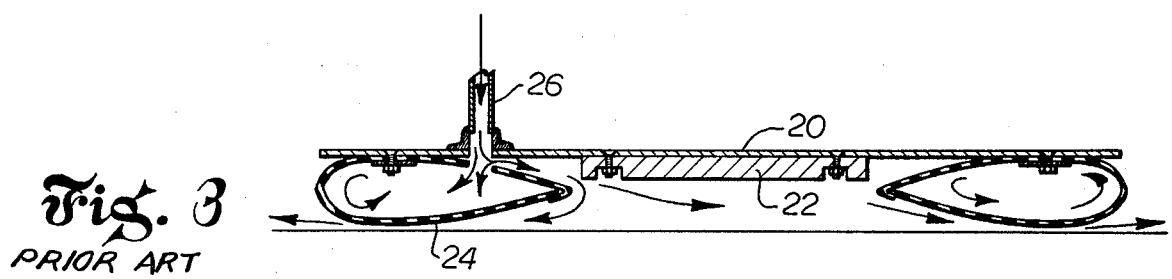
FIG. 3 is a vertical sectional view of a prior art air film bearing.

The air film bearing as taught by the Crowley prior art and shown in FIG. 3, is likewise circular in configuration and the skirt bag itself is tear drop in shape when seen in cross-section. Again, this view discloses a rigid load supporting platform 20 having a landing pad 22 and having a, skirt bag 24 secured thereto in addition to a conduit or source of air 26. As the air is forced into the lower portion of the structure it flows into the skirt bag 24 as well as into the plenum filling the entire structure and allowing a film of air to escape beneath the skirt bag essentially friction. Again with respect to this particular configuration, as was discussed with respect to FIG. 2, the compliancy of the bearing is limited by the ability of the portions of the bag itself to expand and contract to accommodate the floor undulations and thus is limited by a combination of the material from which the bag is constructed and the pressure to which the bag must be submitted to provide the necessary lift. Attention is directed to the Crowley U.S. Pat. No. (3,618,694) for more detail.

Figure 4:
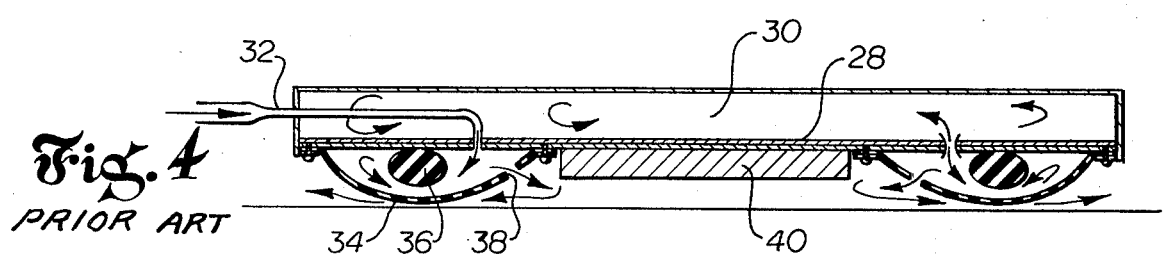
FIG. 4 is a vertical sectional view of another prior art air film bearing.

FIG. 4 is yet another prior art approach based upon the patent and structure of General Motors U.S. Pat. No. (3,268,023) which includes the rigid top plate 28 having an expansion chamber 30 located thereabove. A supply line 32 provides fluid to the interior of a formed rubber sheet 34 which has mounted therein a sponge rubber pad 36. The fluid then escapes out through an opening 38 into the plenum area and when the pressure is sufficient escapes beneath the sheet 30 and provides a supporting film. It is to be noted that this device also includes a landing pad 40 secured to the under portion of the rigid plate member 28. The utilization of a formed rubber sheet 34 secured to a rigid plate member permits the peripheral configuration to move to a slightly modified circular design since the plate 28 absorbs some of the outwardly directed pressure. The compliancy of this bearing, however, is substantially limited.

Figure 5A:
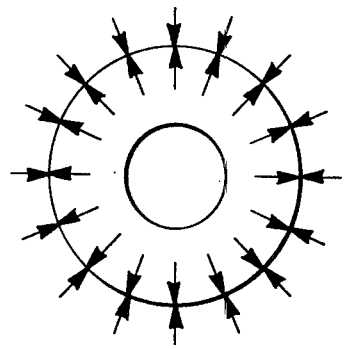
FIG. 5a is a graphical representation of some of the stresses encountered and necessarily controlled by the skirt bag in a circular design fluid or air film bearing.
Figure 5B:
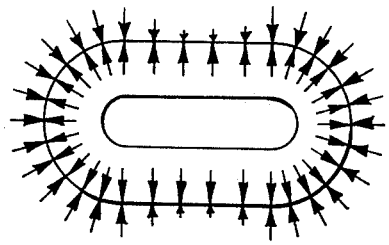
FIG. 5b is a graphical representation of the stresses generated and necessarily controlled by the skirt bag in a fluid film bearing having an oval or race track design.
Figure 5C:
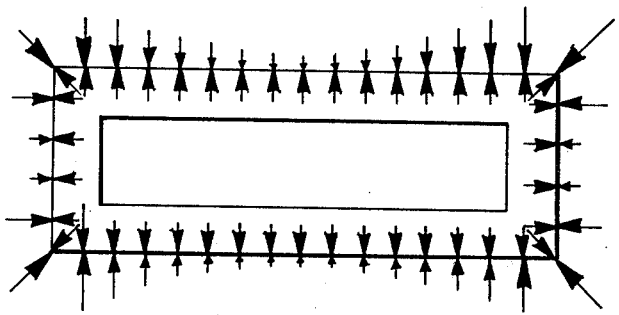
FIG. 5c is a graphical representation of the stresses developed and necessarily controlled by the skirt bag in a rectangular film bearing.

Referring now to FIGS. 5a-c, the various forces which are encountered in an inflated skirt bag, the critical portion which enables the fluid bearing to work are illustrated. As seen in FIG. 5a, a round peripheral design, the forces generated in the interior of the skirt bag as well as in the plenum are all met with equal and opposite diametrical forces which are uniform throughout the entire periphery. This design tends to be self compensating. Looking now at FIG. 5b, however, it can be seen that the race track design presents some different problems in that the force on the interior of the plenum and the skirt bag is uniform in an outward direction when under inflation or pressure. The ability of the structured fabric itself to resist this outward pressure is substantially less along the elongated or linear portions since they do not have inherent "hoop" strength thus making them weak and vulnerable to rupture or alteration toward a more circular configuration. The rectangular bearing seen in FIG. 5c further illustrates the point by noting that the corners of the bearing have exceedingly high resistance to outward pressure. This resistance decreases to a minimum retention strength area at the midpoint or approximately the midpoint of either of the elongated side portions.

It is the advantage of the noncircular configuration in conjunction with the inherent weaknesses encountered by both the race track and the rectangular bearing to which the present application is directed. The comparative statistical data, as pointed out in the parent application, illustrates that a peripheral shape different from circular makes it possible to achieve maximum utilization of the area available beneath the load to be moved since it can more closely conform to the load supporting structure. This being the case, it is imperative that the design include integral structural members which counteract the natural tendency of the inflated object to assume a peripherally circular configuration without unecessarily reducing compliance.

It is again important to note at this juncture that the present application deals with fluid film bearings as opposed to air cushion structures. The primary and critical difference between the air cushion structure and the air film structures lies in the fact that the air film works on a fairly high pressurized fluid and minimal clearance from the supporting surface thereby requiring a relatively smooth and planar surface whereas the air cushion structure works on the principal of large volume low pressure air and has substantial clearance between the bottom of the structure and the supporting surface thus enabling the structure to operate on far less critical conditions.

Figure 6:
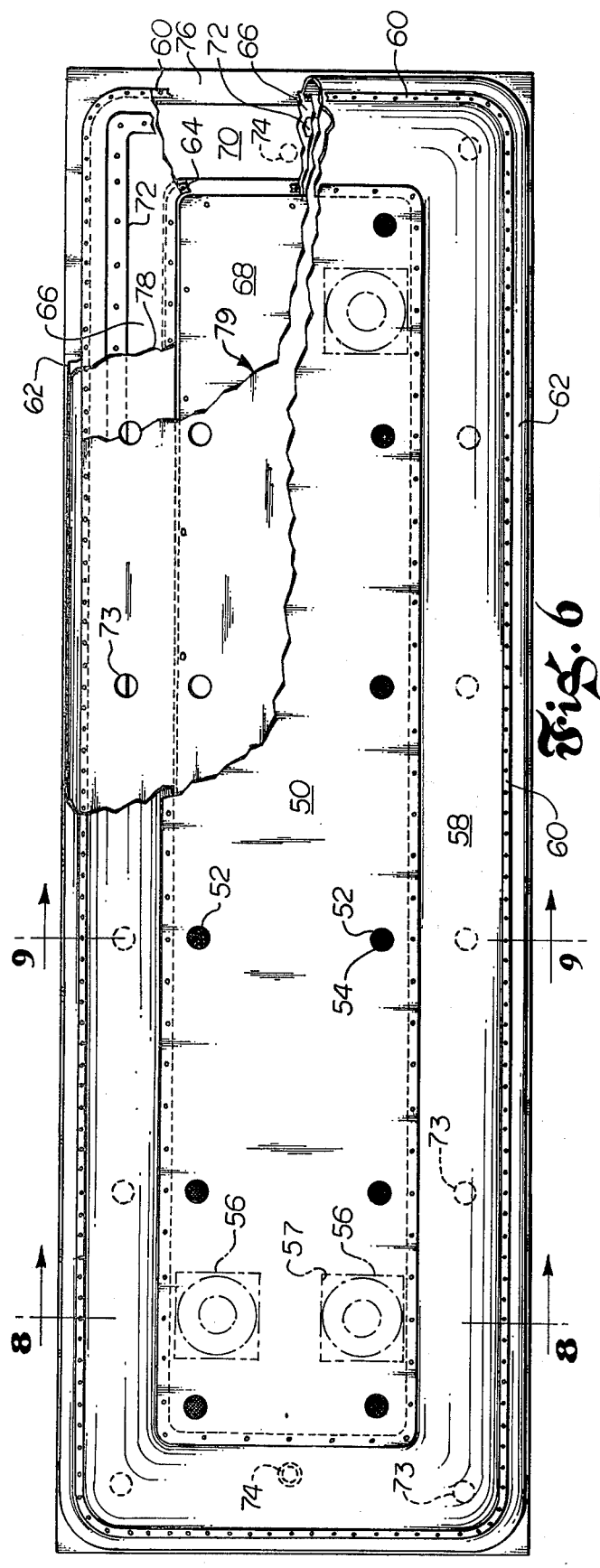
FIG. 6 is a plan view, partly broken away, of the preferred embodiment of a rectangular fluid film bearing.

Referring now to FIG. 6, a bottom plan view of the preferred embodiment, partially broken away for clarity, illustrates that the bearing includes a lower landing pad 50 having a plurality of openings 52 passing therethrough. Each of the openings 52 is covered by a debris screen 54 which prevents foreign material from entering the upper portion of the plenum. The landing pad 50 preferably includes locations for low capacity bearings 56 which may be selectively mounted within a cavity 57 in the landing pad to provide easy movement of the main bearing structure. The low capacity bearings 56 would be such that when expanded or inflated they would easily support the bearing and permit easy movement to a position beneath the load for the main bearing. The low capacity auxiliary bearings are mounted in a cavity within the landing pad so they are above the plane of the landing pad when collapsed and will not be damaged when the main bearing is collapsed. The auxiliary bearings while having sufficient capacity to support the main bearing, are specifically designed and placed such that the main bearing may be moved to a position beneath the intended load. In general, the load would be located upon a plurality of load support blocks and the main bearing when supporting by the inflated auxiliary bearing has clearance with respect to the intended load and therefore, may easily be moved into position.

Secured to the outer portion of the lower landing pad 50 is the lower half of the nylon reinforced skirt material 58 which has secured thereto a segmented metal band or strip which has in turn secured thereto a second section of nylon reinforced skirt material 62. As seen in the right hand upper portion of the figure there is yet another segmented metal reinforcing band 60 which secures the skirt portion 62 to the upper skirt portion 66 if nylon reinforced material. The upper skirt portion is in turn secured to the segmented bolting ring or bar 72 which in turn is secured to the rigid top plate 70. The relative position of these elements may be more clearly seen in FIGS. 8 and 9.

Also to be seen in FIG. 6 is the plurality of flow interchange holes 73 which permit the passage of fluid between the various chambers in the segmented skirt as will be explained hereinafter. Further to be seen are a plurality of openings for supply lines 74 which as seen in better detail with respect to FIG. 8 serve to keep the bearing inflated. The structural interface 76 can be seen above and extending beyond the rigid top plate 70.

Figure 7:
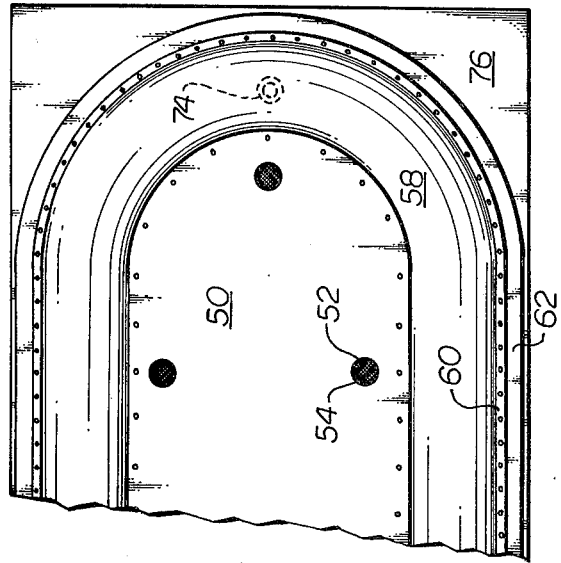
FIG. 7 is a partial plan view of a fluid film bearing of a race track configuration.

Referring now to FIG. 7 a race track design bearing may be seen and since, with the exception of the particular shape, the elements are identical, identical nomenclature will be used to identify parts, i.e., 50 for the lower landing pad, 58 for the lower portion of the skirt bag, 60 for the segmented metal ring, 62 for the intermediate material, 52 for the flow interchange holes, 54 for the screen and 76 for the structural interface.

Referring now simultaneously to FIGS. 8a and 8b views showing differing conditions of the auxiliary bearing taken along lines 8—8 of FIG. 6 depicts the preferred embodiment of the bearing in FIG. 8a with both the main skirt bag and the auxiliary bearing collapsed and in FIG. 8b with the auxiliary secondary smaller bearing inflated. As shown in FIG. 8a, the bearing and any supported load would be resting directly upon the supporting surface, having the lower landing pad 50 in contact with the supporting surface as well as in contact with the upper landing pad 68. As can be seen in this view, and as noted above, the main skirt bag is in a collapsed condition with the fluid or air being shown escaping partially upwardly through the conduit 74, necessary for complete collapse, allowing the bag and its enclosed separable reinforcing elements 78, 80, as will be described in greater detail hereinafter, to assume a collapsed close proximity condition. During inflation and use, the membranes 78 and 80 separate at their outer edge allowing the skirt bag to achieve far greater lift and increases the ability of the bearing to comply. Also to be seen is the fact that the inner ends of the two piece membrane elements, 78, 80 as well as the inner edge of the upper and lower skirt bag 66, 58 are secured to a segmented metal band 64 which is mounted to the lower landing pad 50 but is received within a set back 65 of the upper landing pad when the bearing is collapsed. As seen in this view, the smaller bearing 56 which would be supplied with fluid by conduit 55 is in a collapsed position located completely above the lower surface of lower landing pad 50 thus allowing the lower landing pad to be in direct contact with the supporting surface.

Reference is now directed to FIG. 8b, which is similar to FIG. 8a with the exception of the fact that the small bearing 56 has been inflated. The inflation of bearing 56 lifts the lower landing pad from the supporting surface and allows the main fluid bearing to be easily moved from place to place and located in the desired position for lift while increasing the profile of the bearings only slightly, thus enabling operation in a minimum clearance space beneath the mass to be carried. Further to be noted in this particular view, is the fact that the small bearing 56 is likewise located within a recessed portion 57 of the lower landing pad such that when the bearing is deflated the bearing 56 will not be damaged when the landing pad 50 settles to the floor but has sufficient expansion capability such that it will lift the main bearing when inflated.

FIG. 9 depicts a typical bearing constructed as in the preferred embodiment and as seen along lines 9—9 of FIG. 6 when in the inflated or operative condition. As has been done hereinbefore, similar numerals are used to indicate similar elements. As seen in this view, the bearing is inflated and is transversing an undulated support surface to depict the compliance and reaction of the bearing. As seen, the fluid under pressure is forced downwardly through conduit 74 having an intersecting conduit 75 and a back drainage valve 86. The fluid flows simultaneously outwardly into the space between the upper landing pad 68 and the lower landing pad 50 as well as into the interior of the skirt bag which is comprised of flexible elements 58, 62 and 66. Valve 86 is incorporated to provide back draining since a closed valve in supply line 74 will allow 58 to seal against the surface. The noncompressible fluid would then be static and unless a back drain 68 is provided, the bearing will tend not to deflate. Back drain 68 provides a rapid and controlled deflation rate. As the skirt bag is filled with the fluid the two piece stabilizing membrane section 78, 80 separates giving the bearing the ability of far greater compliancy as is illustrated by the differing expansion conforming to the undulated supporting surface of the opposite sides of the bearing itself. As is obvious, the bearing on the right side of FIG. 9 is in a position wherein the supporting surface is somewhat lower and thereby the skirt bag has expanded to fill the void whereas some of the fluid to accomplish this may have been forced from the left hand side of the bearing wherein the distance between the load and the supporting surface is far less. Further, it is to be seen in this view that the flow of fluid from the portion between the upper landing pad 68 and lower landing pad 50 and into the lower plenum chamber which is defined by the supporting surface by the skirt bag and by the lower landing pad is likewise compensating for the undulated supporting surface. Particularly to be noted in this view is the element 80 which is a continuous piece of material having a high tensile strength and is secured to element 78 by means of the segmented ring 64 and appropriate securing elements. The utilization of the high tension member 80 in conjunction with the high tension element 78 permits the outward stress generated by inflation of the bearing and filling of of the plenum to be transmitted from the middle portion 62 of the skirt bag through the members 78 and 80 to the opposite side thus serving to equalize the opposing forces, approximating a "hoop". As shown earlier (and later in FIG. 11), compliancy of the bearing is derived from the ability of the confined fluid to cause the bag materials 58 and 66 to expand and contract to each side of the horizontal center line plus the center line rises and falls in relation to that expansion. By utilizing a bifurcated element formed by adding member 78 to member 80, the horizontal center line splits vertically and form a third and separate expansion chamber. This center line splitting enables the bearing to have far greater jacking capacity and thus greatly increases the utility. The inherent ability of the structure to "float" or comply with the supporting surface is critical in that, as is known in the art, a continuous film of fluid must pass beneath the skirt bag and the supporting surface around the entire periphery. In addition to the ability to fabricate non-circular bearings with the inventive structure, as has been pointed out and illustrated, the ability of the skirt bag to vertically expand to a greater degree allows the skirt bag to fill the constantly changing space between the load and the supporting surface, assuring a constant and consistent fluid film.

As seen in FIG. 10, the bearing is shown in compliance with a varying support surface and the internal reaction of lateral movement toward a position of the supporting surface having slightly higher relative surface will be discussed. As the bearing moves the fluid which is captured, in the plenum area as well as in the skirt bag itself, is caused to flow and since the liquid is non-compressible, must in some instances reverse within the conduit 74. When air is used as the expansion medium the shock effect of an undulation does not usually present a major problem in that the air is compressible and will absorb the shock of, and dampen the effect of, a high speed transfer generated thereby. With respect to a fluid such as water or the like, however, the sudden change in terrain develops a shock force which could upset the fluid film balance and perhaps cause structural damage. As seen in this view, two separate and not necessarily related means for handling the surge of fluid are shown. As seen to the left hand portion of this view, the conduit 74 has included as an integral portion thereof a one way check valve 88 which allows fluid to be forced downwardly into the system but will not allow a return of the fluid thus assuring a substantially constant volume of fluid even under impact condition. In communication with the conduit 74 is a second conduit 90 leading to an accumulator chamber 92 which could easily be built within, and as an integral part of, the structural interface 76. As seen in this view, the accumulator chamber includes an integral flexible membrane 94 having a compressible gas sealed to one side and room on the opposite side to absorb the fluid which has been impacted by the contact with an upwardly rising undulating surface.

Another means of relieving the impact stress generated by a surface having undulations may also be seen in this view. The alternate method is a simple bypass which would immediately absorb some of the stress generated within the skirt bag, an area normally under greater pressure than the plenum. As seen, a conduit 94 has communication with the interior of the skirt bag itself and serves as a means to conduct the fluid back to the plenum by having its opposite end open to the plenum area. It is important to note that there is a one-way check valve 96 mounted within the conduit 94 which allows the fluid to move from the skirt bag to the plenum but not the reverse assuring consistent relative pressures under normal operating conditions.

A portion of a second and more elementary embodiment of a bearing which would utilize liquid as the pressure medium in a satisfactory manner but would be somewhat limited in the fact it would not have the ability to accommodate the wide range of undulation as shown in FIG. 11. As seen in this view, the central membrane 79 is continued through the operational centerline of the skirt bag and is secured to the outer periphery of the skirt bag. As seen in this view, the skirt bag is constructed without the central expandable portion 62 as was evident in FIG. 9 but instead is constructed of the upper flexible portion 66 and the lower flexible portion 58. The structure, satisfactory for many uses does not have the ability to comply to as great an extent but is capable of being operational in non-circular configurations. The member 79 is flexible, secured to the landing pad and permits a plane passing through the vertical midsection of the skirt bag to move away from the load for increased flexibility.

FIG. 12 illustrates another embodiment for use with an air bearing wherein the membrane 79 while extending across the plenum of a noncircular bearing terminates at the inner portion of the skirt bag. The skirt bag is fabricated of a single piece of material or a piece of spliced material 94 which in cross-section assumes a tear drop configuration. This configuration has proven commercially to be satisfactory in that it does not have a tendency to hop under pressure and the addition of the internal membrane 79 permits this particular structure and proven skirt bag configuration to be utilized in non-circular bearings.

Figure 13:
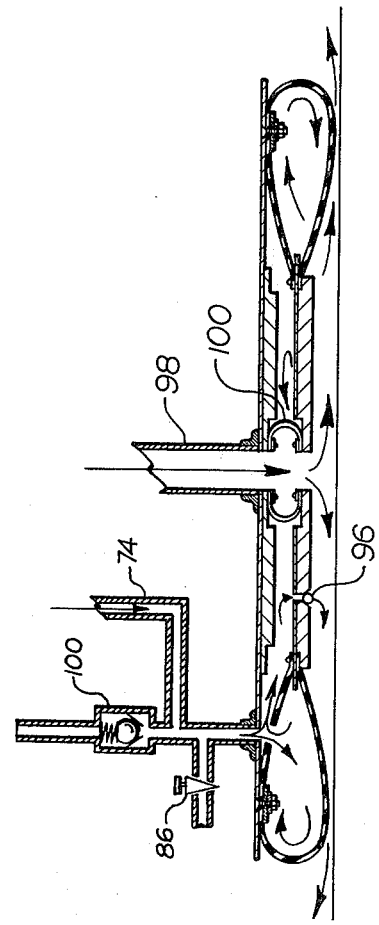
FIG. 13 is a sectional view of a modification of an air bearing capable of passing over a rougher surface.

Attention is directed to FIG. 13 which depicts structure which is very similar to that shown in FIG. 12 except that the bearing has been modified somewhat to accommodate a less smooth supporting surface. It must be recognized that the term "smooth surface" is not specific and therefore ought to be carefully scrutinized, however, it should be sufficient to say at this point that a normal air film would be approximately 0.001 to 0.005 of an inch thick whereas the utilization of the bearing hereinafter described allows flow to increase to 0.2 or in extreme cases to 0.8 of an inch thus enabling the bearing to traverse with less care of preparation surfaces. The alteration in the bearing to accommodate the less smooth surface includes a preset pressure relief valve 100 within the conduit 74 structure which also may be used with accumulator 92 (FIG. 10) and further a drain valve 86 for collapsing the bearing. The further addition which allows a larger volume of air to escape out beneath the skirt bag generating a thicker film includes one way flow valves 96 secured within the openings between the lower plenum chamber and the chamber between the lower landing pad and the upper landing pad as well as a high pressure conduit 98 feeding directly to the lower plenum area. The fluid under high pressure is kept from migrating to the upper plenum, between the two landing pads by means of collapsible conduit 100 which conducts the fluid directly to the lower plenum. As the fluid is forced down through the conduits 98 and 100 it has no possible escape route except out beneath the bearing skirt bag thus raising the entire structure by the thickness of the film.

It is acknowledged that this is an expensive way to accomplish the end in that the fluid supplied in great quantities and under great pressure consumes a great deal of energy, however, it is important to note that this is in many cases the reasonable solution and a less expensive solution to a surface problem.

As can readily be seen, the present invention deals with a unique modification of a presently commercial and available bearing. The improvement makes the bearing far more able to handle greater loads and accommodate less smooth surfaces as well as surfaces that have greater undulations without danger of damage to the bearing or the necessity of resorting to other means for transporting the load.

What is claimed is:

1. A fluid bearing capable of conforming to and effectively passing over an undulated support surface:

a generally planar, imperforate upper member having at least one opening therethrough for the passing of a high pressure fluid medium from a supply means to a plenum below the upper member, peripheral inflatable skirt bag means secured to the upper member, said skirt bag means being of a flexible material formed in a closed continuous skirt about the upper member having openings about the interior surface for fluid communication with the plenum defined by skirt bag means, the upper member and supporting surface whereby fluid under pressure fills the skirt and the plenum and then escapes in a thin film beneath the skirt, supporting the bearing and its load in a friction free condition, a substantially continuous tension membrane dividing the plenum into upper and lower chambers, said tension membrane having a plurality of openings therethrough to permit the passing of fluid therethrough, resulting in a substantially equal pressure within the plenum, said membrane extending across the plenum between opposite portions of the skirt bag means to counteract the outwardly directed force generated by the pressurized fluid, said tension membrane capable of moving within the plenum whereby the skirt bag means has greater vertical dimension augmenting compliance.

2. A bearing as in claim 1, wherein the tension membrane is bifurcated at its outer peripheral portion and secured to the exterior portion of the skirt bag means and vertically spaced peripheral lines of attachment thereby increasing the vertical dimension during expansion permitting greater compliance and resulting in greater clearance.

* * * * *